United States Patent [19]

Szarka

[11] Patent Number: 4,875,268

[45] Date of Patent: Oct. 24, 1989

[54] APPARATUS FOR MOUNTING ARTICLES OF CLOTHING TO A PRINTING PALLET

[75] Inventor: Sandor Szarka, Franklin Lakes, N.J.

[73] Assignee: Precision Screen Machines, Inc., Hawthorne, N.J.

[21] Appl. No.: 283,466

[22] Filed: Dec. 12, 1988

[51] Int. Cl.⁴ .......... B23Q 1/02

[52] U.S. Cl. .......... 29/283; 101/126; 101/407.1; 223/51; 223/120; 269/47

[58] Field of Search .......... 29/559, 283; 101/126, 101/129, 123, 407.1, 35, 41, 42, 43, 44; 223/68, 69, 51, 120; 269/47

[56] References Cited

U.S. PATENT DOCUMENTS

| | | | |
|---|---|---|---|
| 3,244,093 | 4/1966 | Vasilantone | 101/126 |
| 3,427,964 | 2/1969 | Vasilantone | 101/126 |
| 3,977,322 | 8/1976 | Jaffa | 198/803.01 |
| 4,031,825 | 6/1977 | Jaffa | 101/126 |
| 4,388,862 | 6/1983 | Thomas, Jr. | 101/126 |
| 4,407,195 | 10/1983 | Jaffa | 101/126 |
| 4,606,268 | 8/1986 | Jaffa | 101/126 |
| 4,735,139 | 4/1988 | Szarka | 101/126 |

*Primary Examiner*—Timothy V. Eley
*Assistant Examiner*—K. Jordan
*Attorney, Agent, or Firm*—Hopgood, Calimafde Kalil, Blaustein & Judlowe

[57] ABSTRACT

An apparatus and method for mounting articles of clothing to a printing pallet for use with a screen printing machine which comprises a sleeve having a channeled portion to slidably receive the pallet, a support structure adapted to releasably support said sleeve in a position which facilitates the mounting of each article of clothing to the outer surface of the sleeve and the transfer of the article from the sleeve to the pallet.

6 Claims, 4 Drawing Sheets

APPARATUS FOR MOUNTING ARTICLES OF CLOTHING TO A PRINTING PALLET

BACKGROUND OF THE INVENTION

The invention relates to printing machines and associated accessories used for the printing of images on articles of clothing. More particularly, the invention relates to an apparatus and method for mounting articles of clothing onto a printing pallet.

The printing of images on articles of clothing (such as T-shirts and the like), is commonly accomplished using screen printing machines. Generally, these machines are provided with a series of pallet support means which are adapted to continuously transport a series of printing pallets to and from various printing stations located along the length of the machine. A screen printing apparatus of this general configuration is disclosed, for example, in U.S. Pat. No. 3,795,189, the disclosure of which is hereby incorporated by reference. In operation, the clothing or other fabric material to receive a print image is placed on the pallets so that the surface of the fabric to be printed upon is exposed to the printing mechanisms. The pallets are then indexed along a continuous path to individual print stations where printing heads are lowered toward the pallet and an image is transferred to the fabric. In instances where two-sided printing is desired, the pallet may then be turned over. If, however, the pallet is not adapted for two-sided printing, the garment must be removed from the pallet and remounted with the second side to be printed exposed to the printing head. In the past, the mounting of the garment onto the pallets was accomplished manually. Since the pallets are generally large and bulky, manual loading of the pallets is awkward and time consuming, thereby reducing the efficiency of the entire printing operation. Additionally, manual mounting often results in improper alignment of the clothing on the pallet, thereby causing poor quality prints.

SUMMARY OF THE INVENTION

In accordance with one aspect of the present invention, there is provided an apparatus and method for mounting articles of clothing to a printing pallet comprising: a sleeve adapted to receive articles of clothing to be mounted on the pallet, wherein said sleeve is so configured as to allow the pallet to pass through the sleeve; and supporting structure adapted to support the sleeve in an orientation which facilitates mounting the article of clothing over the sleeve and the transfer of said article of clothing from the sleeve to the pallet as the pallet passes through the interior of the sleeve.

Accordingly, it is an object of the present invention to provide an apparatus and method which facilitates the mounting of articles of clothing to a printing pallet.

Another object of the present invention is to provide an apparatus which enables accurate mounting of the articles of clothing to a printing pallet so as to improve the quality of images printed on the fabric.

Still other objects and advantages of the present invention will become apparent from the following description of the preferred embodiments.

BRIEF DESCRIPTION OF THE DRAWINGS

The invention will be better understood from the following description taken in conjunction with the appended drawings in which.

DETAILED DESCRIPTION OF THE PRESENTLY PREFERRED EMBODIMENTS

Figure 1:
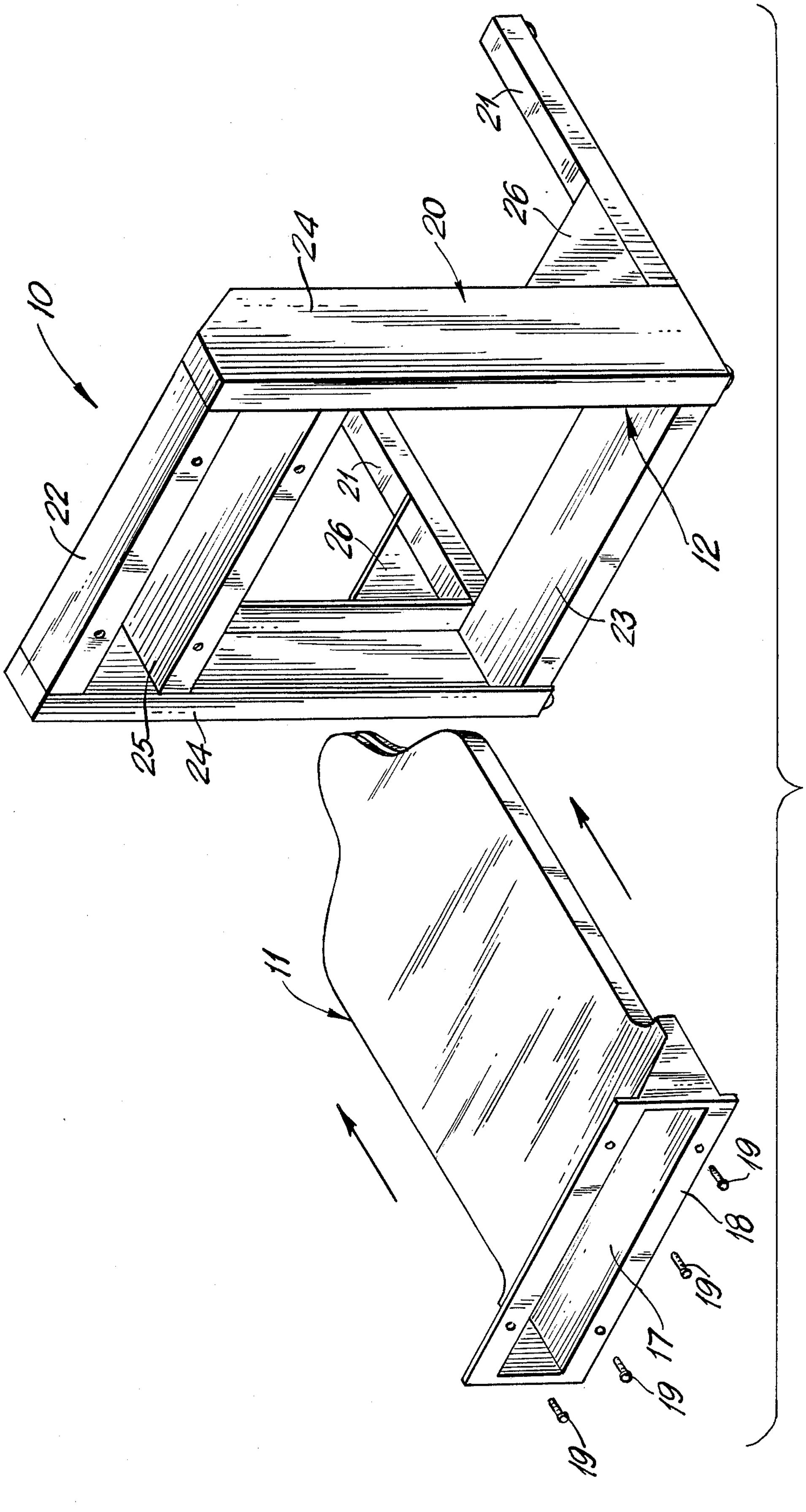
FIG. 1 is an perspective view depicting the pallet sleeve and support structure of the present invention.

Referring now more particularly to the accompanying drawings, wherein like numerals designate similar parts throughout the various views, attention is directed first to FIG. 1 wherein the apparatus of the present invention is designated generally by reference number 10. More specifically, apparatus 10 comprises a pallet sleeve 11, and cooperating support structure 12.

Figure 3:
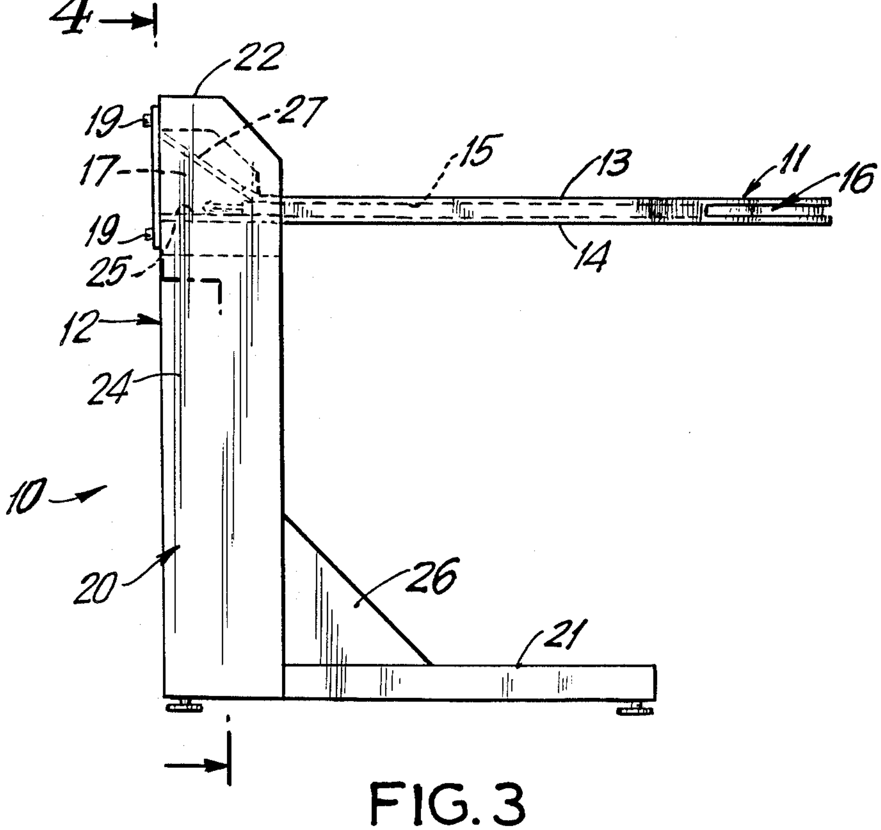
FIG. 3 is a side view of the apparatus of the present invention.
Figure 4:
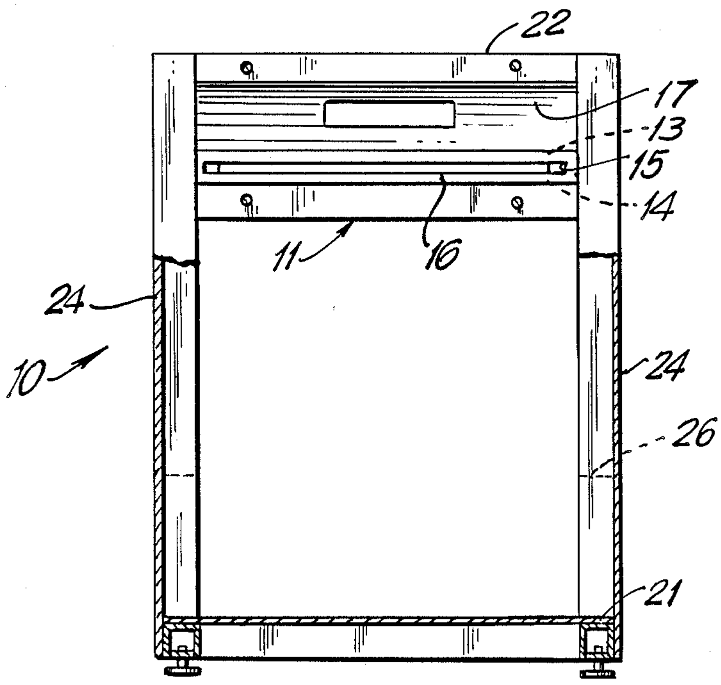
FIG. 4 is cross section of the structure taken along line 4 of FIG. 3.

As seen in FIG. 1, sleeve 11 comprises upper and lower sleeve panels 13 and 14 (FIGS. 3 and 4) which define a relatively narrow linear pathway or channel 15 (FIG. 4). Channel 15 is adapted to slidingly engage a pallet 16 and is provided with a funnel shaped inlet 17 which facilitates insertion of the pallet into channel 15 by effectively guiding the pallet into the channel.

Although sleeve 11 is depicted in the drawings as having a T-shirt configuration in plan, it is understood that the configuration of sleeve 11 may be varied to accommodate different shaped garments, provided however that channel 15 maintains a predetermined minimum width and height along the length of the sleeve so as to allow pallet 16 to pass through the entire length of the sleeve. Sleeve 11 also includes mounting flange 18 located adjacent inlet 17. Flange 18 serves to removingly secure sleeve 11 to support structure 12 using suitable fasteners 19. In this manner, sleeve 11 may be removed from support structure 12 and replaced with a sleeve of different sleeve or configuration.

Sleeve 11 is also provided with recess 27 (FIGS. 2 and 3) which facilitates removal of pallet 16 from sleeve 11. In the embodiment shown, recess 27 is formed by removing a section of funnel shaped inlet 17 of suitable size and shape to allow a worker's hand sufficient clearance to firmly grasp pallet 16 during its insertion or removal from sleeve 11. Although recess 27 is depicted as a simple opening, it may take any form so long as it provides sufficient clearance for the operator's hand and does not interfere with the insertion of a pallet into channel 15.

Figure 2:
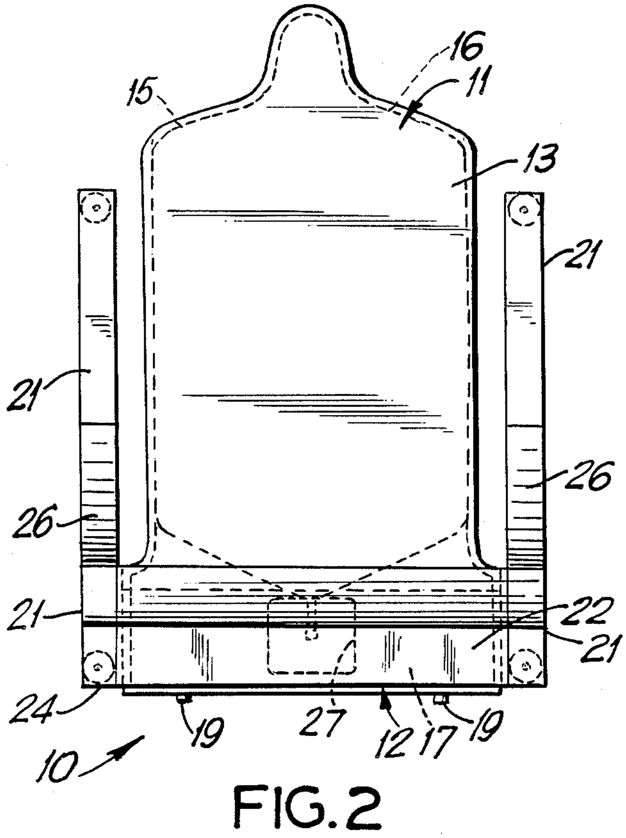
FIG. 2 is a top plan view of the apparatus of the present invention.
Figure 5:
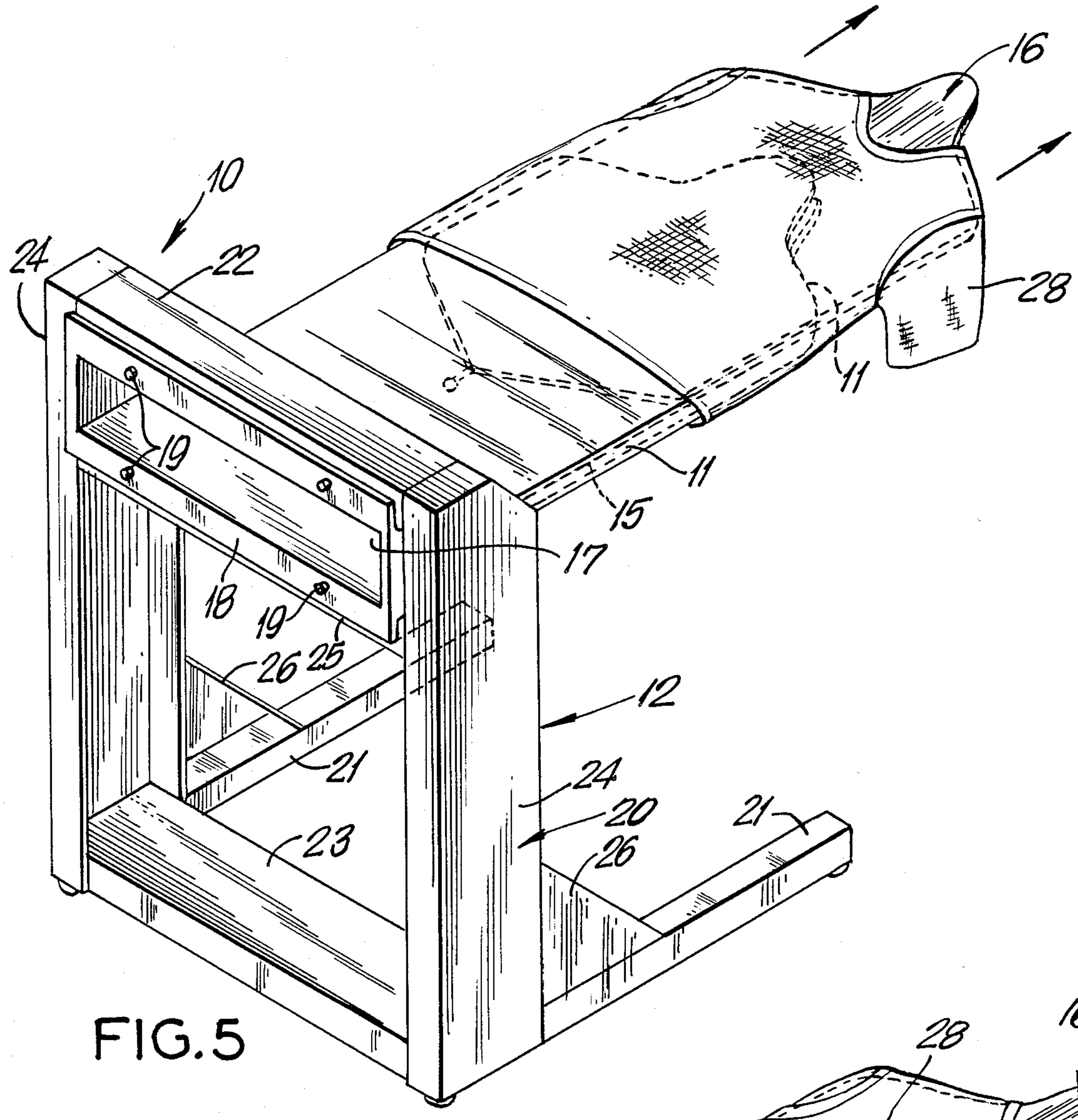
FIG. 5 is a perspective view of the present invention depicting an article of clothing being transferred to a pallet.

Referring now to FIGS. 2, 3 and 5 a support structure 12 for the present invention comprising a vertical frame 20 (FIGS. 3 and 5) and base members 21 is shown. As best seen in FIGS. 3 and 5, frame 20 supports sleeve 11 in a position to facilitate the loading and unloading of the pallet and includes upper and lower bridge members 22, 23, side members 24, and intermediate member 25. As shown in the drawing, frame members 22 and 25 cooperate with flange 18 and fasteners 19 to releasably secure sleeve 11 to the frame. It is noted that the upper portions of side member 24 and upper bridge member 22 are configured so as to surround or cradle inlet portion 17 of sleeve 11 so as to evenly distribute the various forces exerted on the sleeve.

Attached to the lower portion of frame 20 are horizontal base members 21 which support frame 20 in a vertical position. Support structure 12 is also provided with side braces 26 which add strength and rigidity to the structure. Braces 26 are fastened to frame 20 and base members 21 using any suitable fastening means such as welding.

Although the present invention has been described and shown as having the pallet sleeve mounted in a horizontal position, it is understood that it may be oriented in any convenient position by an appropriate support structure. It has been found, however, that positioning the base members 21 as shown not only results in good stability of the apparatus but also the necessary strength and rigidity required, particularly in view of the cantilever design of the sleeve support. It has also been found that horizontal positioning of the sleeve facilitates loading and unloading of the pallet and garment from the apparatus.

In operation, the garment 28 (FIGS. 5 and 6) to be printed upon is positioned on sleeve 11, so that the neck portion of the sleeve passes through the neck opening in the garment. In this regard the sleeve should be suitably configured and sized so that the garment fits snugly over the outer surface of the sleeve without undue stretching or wrinkling.

The operator then inserts the pallet to be loaded into inlet 17. As seen in FIG. 2, when pallet 16 is in its fully inserted position, the neck and shoulders area of the pallet correspond to the neck and shoulder area of sleeve 11.

Figure 6:
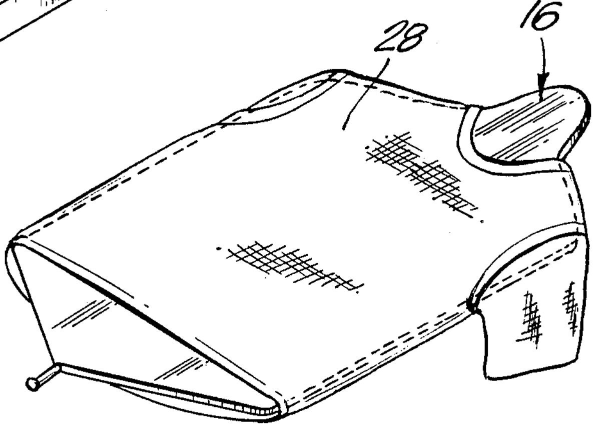
FIG. 6 is a perspective view of a pallet having a garment mounted thereon.

The operator next grasps the neck portion of the pallet and pulls it through sleeve 11, as shown in FIG. 5, such that the shoulder areas of the pallet engage the inner shoulder portions of garment 28, thereby pulling the clothing from the sleeve and onto the pallet. The garment-mounted pallet, as shown in FIG. 6, may then be transferred to a screen printing machine for printing. Although the sequence of operation of the apparatus has been described as above, it is understood that it may be varied. For example, the operator may insert the pallet prior to loading the garment onto the sleeve. Moreover, although the sequence describes loading the pallet from the inlet side of the sleeve so that the pallet passes through the entire sleeve, it is understood that the sleeve may be "reverse" loaded by inserting the pallet directly into channel 15 from the exit side of the sleeve prior to loading the garment onto the sleeve.

The apparatus of the present invention may be constructed of a variety of different materials. However, one should keep in mind when selecting the materials to be used the stresses to which the apparatus will be subjected to in ordinary production line operation. For example, although the frame and support structure has been depicted as being made of metal, any material can be utilized given consideration to the weight and design of the sleeve and support structure. In regard to the sleeve, it has been found that pvc plastic can be efficiently shaped or molded to form the funnel and sleeve component while maintaining structural integrity without undue weight and cost.

Since, from the foregoing, the construction and advantages of the device may be readily understood, further explanation is believed to be unnecessary. However, since numerous modifications will readily occur to those skilled in the art after a consideration of the foregoing specification and accompanying drawings, it is not intended that the invention be limited to the exact construction shown and described, but all suitable modifications and equivalents may be resorted to which fall within the scope of the appended claims.

What is claimed is:

1. An apparatus for mounting articles of clothing onto a printing pallet comprising: a pallet sleeve adapted to receive said articles to be mounted, said sleeve being provided with means for engaging said pallet so as to guide said pallet into the interior of said sleeve; and the means for supporting said sleeve in a position which facilitates the mounting of said articles onto said sleeve and the transfer of said articles from said sleeve to said pallet by removing said pallet from the interior of said sleeve.

2. An apparatus according to claim 1 wherein said pallet sleeve comprises a first member and a second member, said members forming therebetween a channel means for receiving and guiding said pallet.

3. An apparatus according to claim 2 wherein said pallet sleeve further comprises an inlet means for guiding said pallet into said channel means.

4. An apparatus according to claim 2 wherein said pallet sleeve is positioned horizontally by said means for supporting said sleeve, said first member of said sleeve comprising an upper member and said second member comprising a lower member of said sleeve.

5. An apparatus according to claim 1 wherein said means for supporting said sleeve comprises: a sleeve support member adapted to releasably support said sleeve; and, a base attached to said sleeve supporting member.

6. An apparatus for mounting articles of clothing onto a printing pallet comprising:

- a pallet sleeve adapted to receive said articles to be mounted, said sleeve including an upper panel and a lower panel, said panels spaced to form therebetween a channel means for receiving said pallet and for guiding said pallet between said panels;
- an inlet means attached to one end of said pallet sleeve, said inlet means shaped to guide said pallet into said channel means;
- a support structure, for positioning said pallet sleeve to receive said articles and said pallet, having a fastening means for releasably attaching said support structure to said pallet sleeve; and
- a base attached to the lower portion of said support structure.

* * * * *